(12) United States Patent
Findley et al.

(10) Patent No.: US 7,324,538 B2
(45) Date of Patent: Jan. 29, 2008

(54) HIGH-THROUGHPUT STATE MANAGEMENT FOR TCP

(75) Inventors: Randall Lee Findley, Austin, TX (US); Leslie Zsohar, Round Rock, TX (US)

(73) Assignee: nCipher Corporation Limited, Stoneham, MA (US)

( * ) Notice: Subject to any disclaimer, the term of this patent is extended or adjusted under 35 U.S.C. 154(b) by 793 days.

(21) Appl. No.: 10/685,299

(22) Filed: Oct. 14, 2003

(65) Prior Publication Data

US 2005/0078670 A1    Apr. 14, 2005

(51) Int. Cl.
*H04L 12/56* (2006.01)
(52) U.S. Cl. .............. 370/413; 370/389; 370/428; 709/230
(58) Field of Classification Search .......... 370/229, 370/230, 389, 412, 419, 428, 413; 709/203, 709/228, 230
See application file for complete search history.

(56) References Cited

U.S. PATENT DOCUMENTS

2004/0111523 A1*  6/2004  Hall et al. ............... 709/230
2005/0160139 A1*  7/2005  Boucher et al. .......... 709/203

* cited by examiner

*Primary Examiner*—John Pezzlo
(74) *Attorney, Agent, or Firm*—John A. Fortkort; Fortkort & Houston P.C.

(57) ABSTRACT

A state decision subsystem (SDS) including an inload module, a simple programmable entity (SPE), at least one SPE memory, an unload module, and a coherency module. The inload module reads state information from a memory subsystem—the state information corresponding to TCP packets that are to be processed. In addition, the inload module writes contexts to the SPE memory. Each context includes both a TCP packet and its corresponding state information. The SPE reads each context from the SPE memory, processes the context, and writes the processed context to the SPE memory. The processed context includes both a processed TCP packet and its corresponding processed state information. Furthermore, the unload memory reads the processed context and writes the processed state information to the memory subsystem. Finally, the coherency module compares contents of the inload module and the unload module, and if the contents of each correspond to the same TCP connection, the coherency module replaces the state related content of the inload module with the state related content of the unload module.

39 Claims, 6 Drawing Sheets

HIGH-THROUGHPUT STATE MANAGEMENT FOR TCP

CROSS-REFERENCE TO RELATED APPLICATIONS

The current application may share some specification and figures with the following commonly owned and previously filed applications, all of which are hereby incorporated by reference:

COMMONLY OWNED AND PREVIOUSLY FILED
U.S. NONPROVISIONAL PATENT APPLICATIONS

| Atty. Dkt. # | Ser. No. | Title | Filing Date |
|---|---|---|---|
| 501143.000019 | 10/068,295 | Application-Specific Information-Processing Method, System and Apparatus | Feb. 5, 2002 |
| 501143.000021 | 10/078,253 | Controller Architecture and Strategy for Small Discontiguous Accesses to High-Density Memory Devices | Feb. 16, 2002 |
| 501143.000021-D1 | 10/640,499 | Network and Networking System for Small Discontiguous Accesses to High-Density Memory Devices | Aug. 13, 2003 |
| 501143.000021-D2 | 10/640,462 | Memory Request Handling Method for Small Discontiguous Accesses to High-Density Memory Devices | Aug. 13, 2003 |

COMMONLY OWNED AND PREVIOUSLY FILED
U.S. PROVISIONAL PATENT APPLICATION

| Atty. Dkt. # | Ser. No. | Title | Filing Date |
|---|---|---|---|
| 501143.000033 | 60/419,038 | High Throughput State Management for TCP | Oct. 15, 2002 |

The benefit of 35 U.S.C. § 120 is claimed for all of the above referenced commonly owned applications. The contents of the applications referenced in the tables above are not necessarily identical to the contents of this application.

Any references cited hereafter are incorporated by reference to the maximum extent allowable by law. To the extent a reference may not be fully incorporated herein, it is incorporated by reference for background purposes and indicative of the knowledge of one of ordinary skill in the art.

BACKGROUND OF THE INVENTION

1. Field of the Invention

This application relates to the field of managing TCP communications.

2. Description of Related Art

The field of managing TCP communications has a history of rapid development. The speed and volume of TCP communications have increased dramatically every few years. The network infrastructure responsible for carrying TCP communications have not typically been required to process persistent state information. The processing of persistent state information such as TCP connection information has typically been handled by general purpose processors or specialized processors for routing (i.e., stand-alone network processors). However, the volume of TCP communications has increased so dramatically that it is not uncommon for services at the edge of a data center to require the management and processing of one million or more TCP connections. Firewalls, load balancers, etc., could also be enhanced if there were a capability to either terminate or shadow TCP connections at wire speeds.

Figure 1:
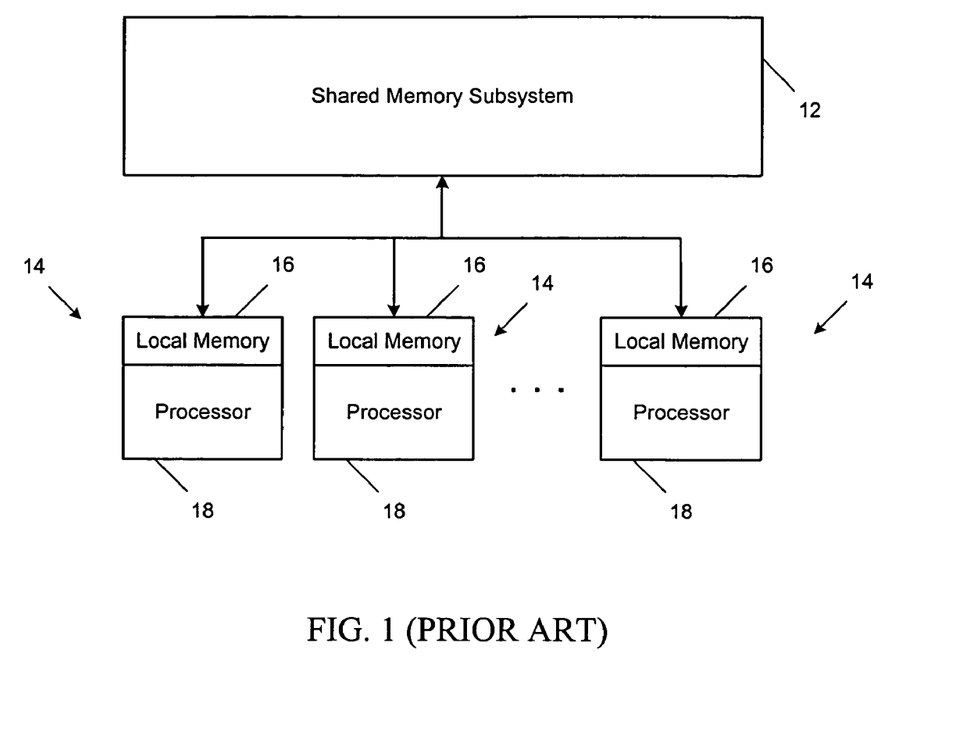
FIG. 1 shows a TCP state management system of the prior art, in accordance with an embodiment of the present invention.

FIG. 1 shows a TCP state management system of the prior art including a shared memory subsystem 12 and one or more general purpose processors 14. Each general purpose processor 14 includes memory 16 and processor 18. One advantage of using general purpose processors 14 is the achievement of a great deal of flexibility in the TCP protocol state management system. However, general purpose processors 14 are not as efficient as would be desired considering the great number of TCP communications typically needing to be processed today. The problem is expected to intensify in the future. Another disadvantage is that a router may be required to ensure transmission of each packet to the proper general purpose processors 14 for processing. Furthermore, a layer of software is typically added to handle the coherency conditions created by communication and data sharing between the general purpose processors 14. Complex coherency conditions can thereby be produced.

BRIEF SUMMARY OF THE INVENTION

An embodiment of the present invention is a state decision subsystem (SDS) including an inload module, a simple programmable entity (SPE), at least one SPE memory, an unload module, and a coherency module. The inload module reads state information from a memory subsystem—the state information corresponding to TCP packets that are to be processed. In addition, the inload module writes contexts to the SPE memory. Each context includes both a TCP packet and its corresponding state information. The SPE reads each context from the SPE memory, processes the context, and writes the processed context to the SPE memory. The processed context includes both a processed TCP packet and its corresponding processed state information. Furthermore, the unload memory reads the processed context and writes the processed state information to the memory subsystem. Finally, the coherency module compares contents of the inload module and the unload module, and if the contents of each correspond to the same TCP connection, the coherency module replaces the state related content of the inload module with the state related content of the unload module.

A variation of the embodiment includes two SPE memories that cooperate to operate as a ping-pong buffer. In another variation, the inload module includes an inload queue for queuing contexts. Similarly, the unload module may include an unload queue for queuing processed context. If such queues are implemented, then the coherency module will need to compare the entire contents of the queues in order to maintain coherency.

One advantage of the present invention in achieving increased efficiency is realized to a greater extent by implementations that prefetch states for a large number of packets. Significant efficiency improvements, due in large part to parallelizing and offloading of data movements, are realized directly in proportion to the number of packets for which state information is prefetched. The efficiency gains can significantly outweigh the additional burden of maintaining coherency among a larger number of prefetched states. In another variation of the embodiment, the inload module classifies TCP packets by packet type and includes packet type information as part of each context. The packet type information can be encoded as a bit vector.

In yet another variation of the embodiment, each TCP packet includes a packet sequence number and a length value. The packet sequence number corresponds to the sequence number of the first byte of the packet. The length value corresponds to the number of bytes contained in the packet. Consequently, the state information corresponding to each TCP packet indirectly includes a value for a next packet sequence number that designates the sequence number of the next TCP packet to be processed. In processing a TCP packet, the inload module determines whether the packet sequence number of the TCP packet corresponds to the next packet sequence number of the TCP connection corresponding to the TCP packet. If not, the inload module stores the TCP packet for processing after processing earlier sequenced packets corresponding to the same TCP connection.

In a further embodiment of the present invention, the SPE recognizes when two contexts are loaded that correspond to the same connection. In that case, the state information of the second context loaded is ignored because the first context's state information, including any modifications, is the more current.

Physical arrangement of embodiments of the present invention can very widely. For example, in some embodiments, SPE memory is implemented in the same physical device as the corresponding SPE, while in other embodiments the reverse is true.

Many other variations of the invention are possible. For example, another embodiment of the present invention is an intranet having at least one SDS as described above that processes packets corresponding to a number of TCP connections such that each connection has its terminations inside of the intranet. Other similar embodiments handle TCP connections each having one termination outside of the intranet. Still other similar embodiments handle some TCP connections having both terminations within the intranet and some TCP connections having one termination outside of the intranet. Another embodiment of the present invention is a load balancer that includes at least one SDS as described above. Furthermore, another embodiment of the present invention is a firewall having at least one SDS as described above. Further embodiments of the present invention could include any other devices that process TCP connections with at least one SDS, including for example, intrusion detection systems, routers, web-caching devices, LANS, and SANS.

Yet another embodiment of the present invention is a TCP acceleration system including an ingress state decision subsystem (SDS), an egress SDS, and a timer SDS that performs timing related tasks. The ingress SDS reads state information from a memory subsystem. The state information corresponds to incoming TCP packets. The ingress SDS also processes the incoming packets according to the state information and writes updated state information to the memory subsystem. The egress SDS reads state information from the memory subsystem. The state information corresponds to outgoing TCP packets. The egress SDS processes the outgoing packets according to that state information and writes updated state information to the memory subsystem. The timer SDS reads state information from the memory subsystem to perform time related processing of the state information and corresponding TCP connections.

Another embodiment of the present invention is an intranet having at least one TCP acceleration system as described above, that processes packets corresponding to a number of TCP connections each having a termination outside of the intranet. Another embodiment of the present invention is a load balancer that includes at least one TCP acceleration system as described above, and yet another embodiment of the present invention is a firewall including at least one TCP acceleration system as described above. Furthermore, embodiments of the present invention could include any other device that processes TCP connections with a TCP acceleration system, including for example, intrusion detection systems, routers, web-caching devices, LANS, and SANS. Therefore, as will be apparent to those skilled in the art, acceleration of TCP processing according to the present invention within the context of the Internet or other networking environment will fall within the scope of the present application.

BRIEF DESCRIPTION OF THE DRAWINGS

The following drawings form part of the present specification and are included to further demonstrate certain aspects of the present invention. The figures are not necessarily drawn to scale. The invention may be better understood by reference to one or more of these drawings in combination with the detailed description of specific embodiments presented herein.

DETAILED DESCRIPTION OF PREFERRED EMBODIMENTS

As noted above, the present invention builds on some concepts analogous to those disclosed by two commonly owned and previously filed U.S. patent applications. The application identified by application Ser. No. 10/068,295 and entitled "Application-Specific Information-Processing Method, System, and Apparatus" discloses an information-processing method for application-specific processing of messages. In that method, a message is received. Then, whether the message is in a selected application format is ascertained. If the message is not in the selected application format, it is routed to a next location. However, if the message is in the selected application format, it is routed to a selected application processor, processed by the processor, and then routed to the next location.

The application identified by application Ser. No. 10/078,253 and entitled "Controller Architecture and Strategy For Small Discontiguous Accesses to High-Density Memory Devices" and its divisional applications identified by application Ser. Nos. 10/640,499 and 10/640,462 and respectively entitled "Network and Networking System for Small Discontiguous Accesses to High-Density Memory Devices" and "Memory Request Handling Method for Small Discontiguous Accesses to High-Density Memory Devices" disclose a memory architecture that use memory devices that would normally be considered disadvantageous, but by accommodating the data input, output, and other peripheral controller services, overall performance in this mode is optimized. The surprising result is that even though the choice of memory is inappropriate for the task based on the precepts of the prior art, the overall memory system is effective. One example of a normally disadvantageous approach that is effective in connection with one or more embodiments of the present invention is bank switching in DDR-SDRAM, thereby achieving feasibility without resort to, for example, SRAM.

Among other advantages achieved, both of the referenced applications improve performance by resolving the presented problem with a solution more closely tailored to the presented problem than the prevailing prior art approach.

Figure 2:
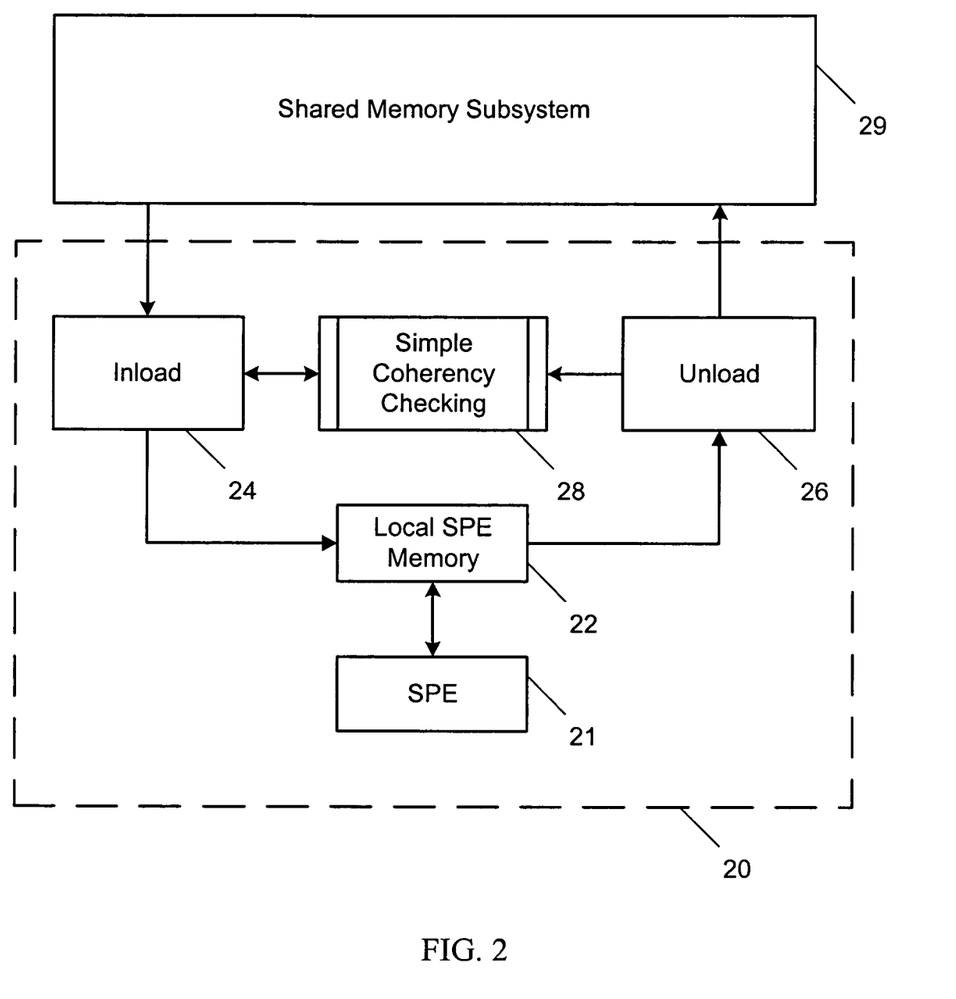
FIG. 2 shows a TCP state management system, in accordance with an embodiment of the present invention.

FIG. 2 shows a TCP state management system having a shared memory subsystem 29 and a state decision subsystem 20. Shared memory subsystem 29 stores state information for TCP connections that are to be processed by state decision subsystem 20. The state decision subsystem 20 includes an inload module 24 and an unload module 26, each in communication with the shared memory subsystem 29, such that inload module 24 reads state information from the shared memory subsystem 29 and unload module 26 writes state information to the shared memory subsystem 29. Coherency checking is performed by simple coherency checking module 28. The module 28 reads information from inload module 24 and unload module 26 to compare state information. If it is determined by simple coherency checking module 28 that state information corresponding to the same packet is present in both module 24 and 26 then the state information corresponding to that packet contained in unload module 26 is written over the state information corresponding to that packet contained in inload module 24. The state information and corresponding packet information is written by inload module 24 to SPE memory 22. SPE 21 reads such state and packet information from memory 22 and processes it accordingly, writing the result to memory 22. Unload module 26 then reads the result from memory 22. It should be apparent that the simple programmable element 21 is not required to address coherency issues. Rather, it simply processes packets according to accompanying state information. In the preferred embodiment, the inload module and the unload module, as well as the simple coherency checking module are implemented as hardware that improves performance significantly. Those functions in the prior art would typically be performed by software resulting in slower performance.

Figure 3:
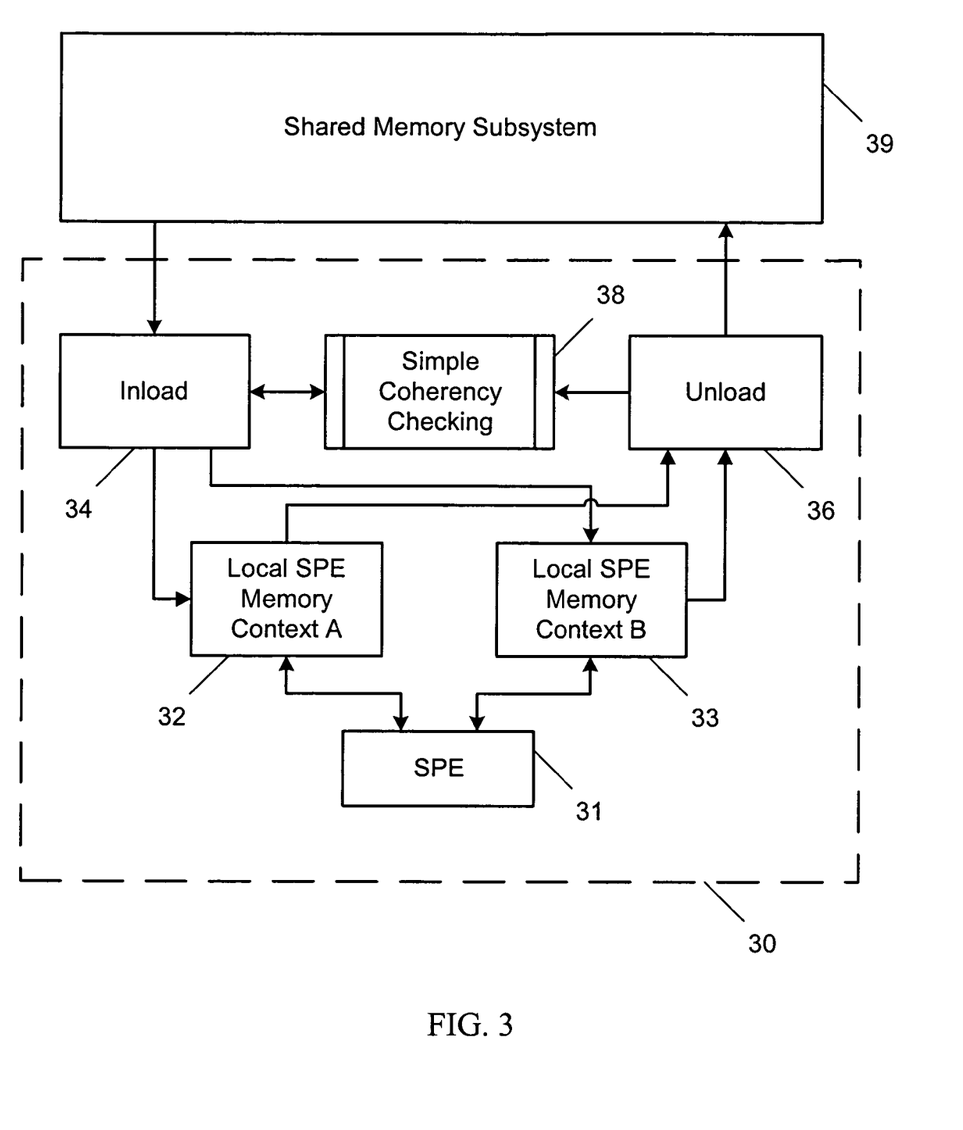
FIG. 3 shows a TCP state management system having a ping-pong buffer, in accordance with an embodiment of the present invention.

Turning to FIG. 3, a TCP state management system having a ping-pong buffer is shown. The system includes state decision subsystem 30 and shared memory subsystem 39. Shared memory subsystem 39 stores state information for TCP connections that are to be processed by state decision subsystem 30. The inload module 34 of subsystem 30 reads state information from subsystem 39. Central coherency checking module 38 then compares the content of inload module 34 with the contents of unload module 36. If state information is found to be contained in inload module 34 as well as unload module 36 that corresponds to the same TCP packet, then the state information from unload module 36 is written over that state information of inload module 34. As in the system of FIG. 2, in the system of FIG. 3, inload module 34, simple coherency checking module 38 and unload module 36 are implemented in hardware in a preferred embodiment. After the simple coherency checking module 38 has finished, the inload module 34 passes state information and corresponding packet information to one of SPE memory 32 or SPE memory 33. The two contexts A and B produce a ping-pong buffer 32, 33 configured to improve the efficiency of state decision subsystem 30 by allowing SPE memory 32 to be read from while SPE memory 33 is written to or vice-versa. So, at any given time, context will be A or B for this system.

For example, if the present state of the system is context A, then inload module 34 writes the state and packet information to SPE memory 32. Subsequently, SPE 31 reads the state and packet information from SPE memory 32, processes the packet information and state information accordingly and then writes the processed state and packet information to SPE memory 32. Concurrently, inload module 34 writes new state and packet information to SPE memory 33. Thus when SPE 31 finishes writing processed state and packet information to SPE memory 32, it is quickly able to read new state and packet information from SPE memory 33 without waiting a significant period of time. Continuing with the operation of the system, unload module 36 reads processed state and packet information from SPE memory 32 and then writes the processed state information to subsystem 39.

The use of a ping-pong buffer is a straight-forward optimization that avoids the SPE 31, having to wait for context to be loaded to or unloaded from its memory. Alternatively, more than two SPE memories could be used to further improve the performance of the system.

Figure 4:
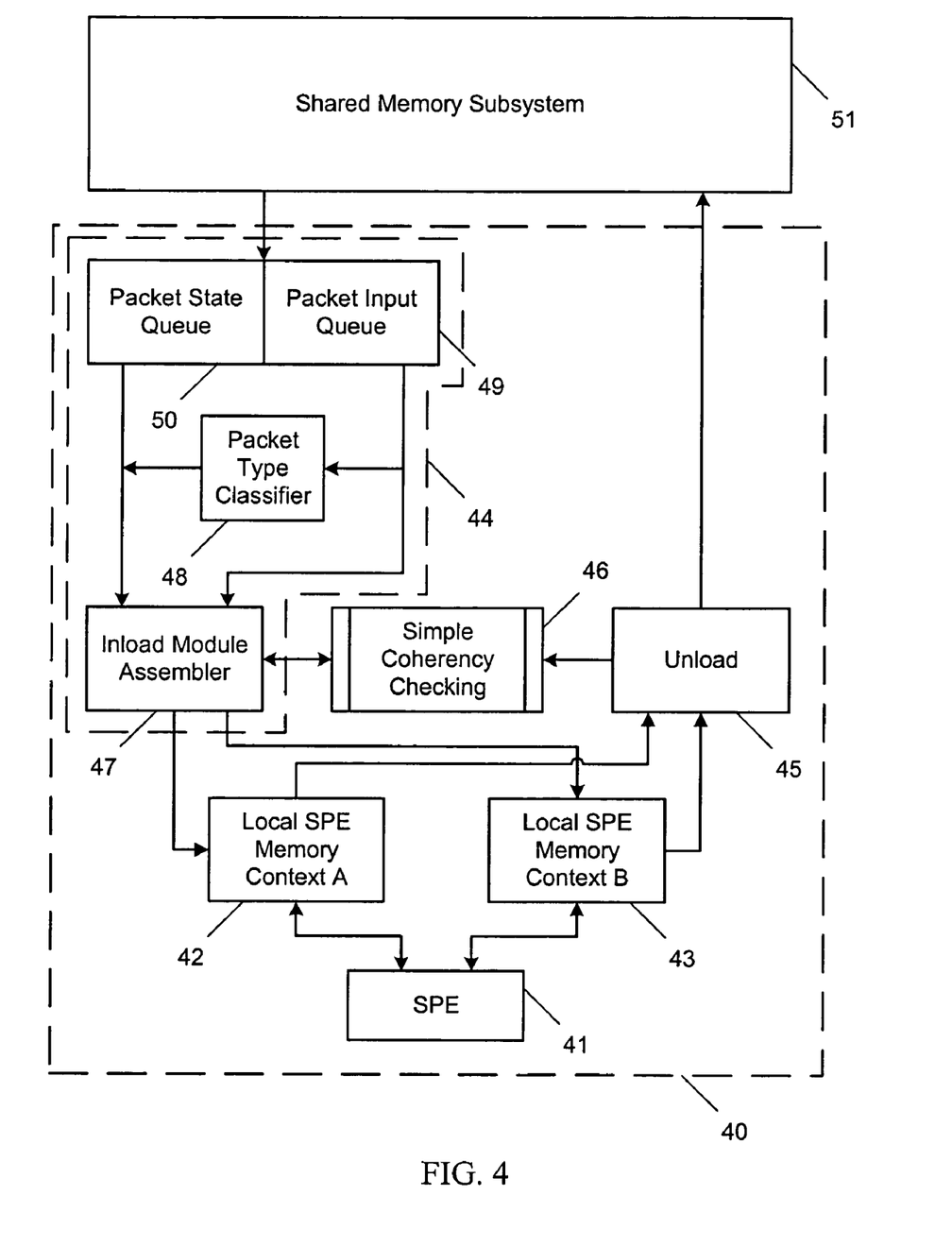
FIG. 4 shows a TCP state management system having a ping-pong buffer and an inload module with packet classification personality, in accordance with an embodiment of the present invention.

Turning now to FIG. 4, a TCP state management system having a ping-pong buffer and an inload module with packet classification functionality is shown. The system of FIG. 4 includes state decision subsystem 40 and shared memory subsystem 51. Shared memory subsystem 51 stores state information for TCP connections that are to be processed by state decision subsystem 40. State decision subsystem 40 includes many components corresponding to state decision subsystem 30. Such corresponding components, while not necessarily identical, perform similar functions in both subsystems. The corresponding components include simple programmable element (SPE) 41 corresponding to SPE 31. SPE memory 42 corresponds to SPE memory 32. SPE memory 43 corresponds to SPE memory 33. Ping-pong buffer 42, 43 corresponds to ping-pong buffer 32, 33. Unload module 45 corresponds to unload module 36. Simple coherency checking module 46 corresponds to simple coherency checking module 38.

A difference between the system of FIG. 4 and the system of FIG. 3 is to be found in the additional functionality of inload module 44 compared to inload module 34. Inload module 44 reads state information from shared memory subsystem 51. The state information is queued in packet state queue 50 while packet information is queued in packet input queue 49. Packet information includes information designating the type of packet. For example, a packet may be a type ACK, SYN, FIN, etc. A packet type classifier 48 preferably implemented in hardware determines the packet type from the packet information and attaches the packet type to the state information, thus inload module assembler 47 assembles the context from state information, type information, and packet information. One alternative would be to encode the type information in a bit vector. Then the inload module 44 would write the context to the appropriate SPE memory 42 or 43.

Figure 5:
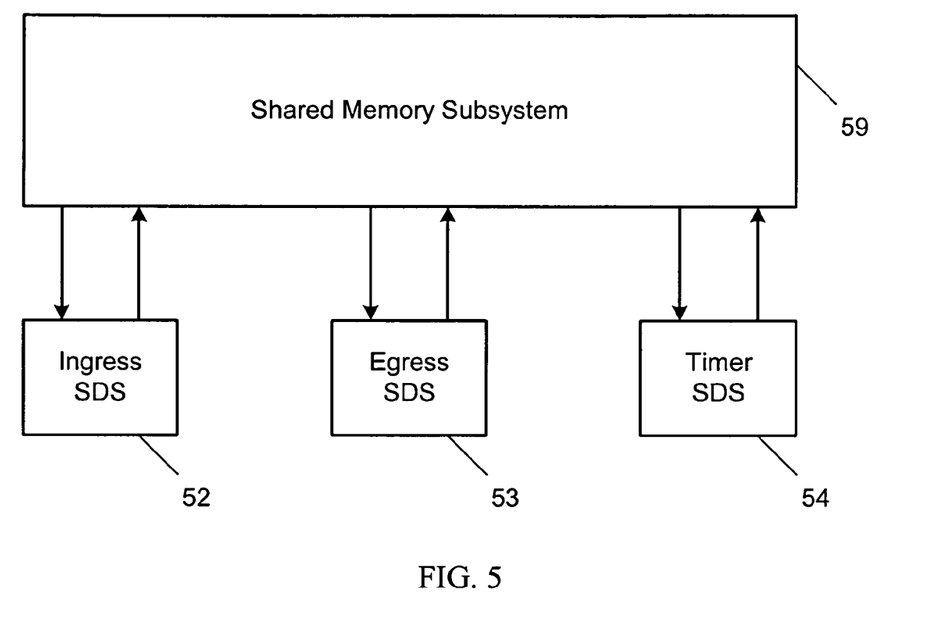
FIG. 5 shows a TCP state management system having multiple state decision subsystems, in accordance with an embodiment of the present invention.

FIG. 5 shows a TCP state management system having multiple state decision subsystems (SDS). Shared memory subsystem 59 stores state information for TCP connections that are to be processed by state decision subsystems 52, 53, and 54. Ingress SDS 52 reads from and writes to shared memory subsystem 59. Egress SDS 53 reads from and writes to shared memory subsystem 59 and timer SDS 54 reads from and writes to shared memory subsystem 59. In a preferred embodiment, the ingress state decision subsystem 52 handles all of the incoming packets from the network and makes decisions related to opening and closing connections. The egress state decision subsystem 53 handles all of the outgoing packets to the network. The timer state decision subsystem 54 handles state updates on the connections related to timed events such as 2MSL, idle connections, etc. In other embodiments, the overall process is divided into other logical portions than ingress, egress and timer. Furthermore in yet other embodiments, the division of functions among the multiple state decision subsystems may be made arbitrarily.

Figure 6:
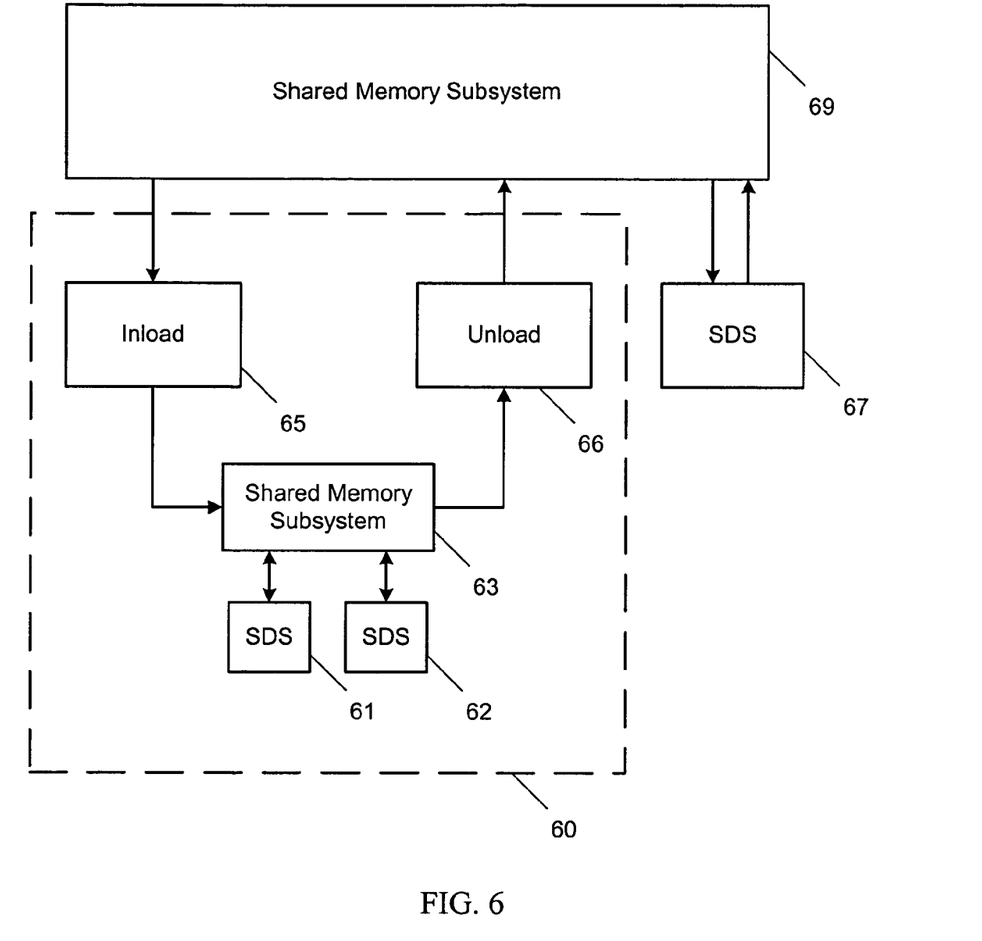
FIG. 6 shows a TCP state management system having a partitioned architecture with state decision subsystems and a shared memory subsystem, in accordance with an embodiment of the present invention.

An alternate implementation of a TCP state management system is shown in FIG. 6. Architecture is partitioned so as to customize the handling of specific sub-problems. Efficiency in handling the specific sub-problems can thereby be improved. Further, the specific sub-problems are thereby handled in parallel in some embodiments, resulting in further overall performance improvement.

The specific system shown in FIG. 6 includes state decision subsystems 60 and 67 and shared memory subsystem 69. Shared memory subsystem 69 stores state information for TCP connections that are to be processed by state decision subsystems 60 and 67. State decision subsystem 60 includes an inload module 65, an unload module 66, a shared memory subsystem 63, and state decision subsystems 61 and 62. Moreover, other alternative embodiments falling within the scope of the present application include multiple state decision subsystems similar or identical to 60 or 67.

According to the specific sub-problems to be addressed, some embodiments implement nesting of one or more state decision subsystems having the same or similar architecture within a state decision subsystem, while others do not.

As apparent to one of ordinary skill in the art, the architecture described provides improved flexibility to implement a complex protocol such as TCP and dedicated hardware to accelerate the system to higher performance levels. Efficiency of the system is improved in part because the simple programmable elements are not required to intelligently move data, needing only to have the context of a single packet to make all of the decisions for that packet. For example, a simple programmable element provided with state information and packet information is able to process that packet without the overhead of coherency issues.

Any element in a claim that does not explicitly state "means for" performing a specified function, or "step for" performing a specific function, is not to be interpreted as a "means" or "step" clause as specified in 35 U.S.C. § 112, ¶ 6. In particular, the use of "step of" in the claims herein is not intended to invoke the provision of 35 U.S.C. § 112, ¶ 6.

It should be apparent from the foregoing that an invention having significant advantages has been provided. While the invention is shown in only a few of its forms, it is not limited to only those forms but is susceptible to various changes and modifications without departing from the spirit or scope thereof.

For example, the inload module 44 of FIG. 4 is shown being implemented in connection with ping-pong buffer 42, 43. But an inload module similar to inload module 44 could easily be implemented in an embodiment of the present invention without a ping-pong buffer being implemented.

Additionally, shared memory subsystems of the embodiments have been shown as single memories apart from the corresponding state decision subsystems. But any single shared memory subsystem could be implemented across multiple memory devices. Also, a shared memory subsystem can be implemented in the same physical device in which the corresponding state decision subsystem is implemented.

Furthermore, any of the above-described state decision subsystems can be implemented as a single physical device, or its functions and modules can be implemented across multiple physical devices having appropriate interconnectivity.

What is claimed is:

1. A state decision subsystem (SDS) comprising:
   an inload module;
   a simple programmable entity (SPE); a first SPE memory;
   an unload module;
   a coherency module;
   wherein the inload module is adapted to read a first state information corresponding to a first TCP packet from a memory subsystem and to write a first context to the first SPE memory, wherein the first context includes the first state information and the first TCP packet;
   wherein the SPE is adapted to read the first context from the first SPE memory, to process the first context, and to write the processed first context to the first SPE memory, wherein the processed first context includes a processed first state information and a processed first TCP packet;
   wherein the unload memory is adapted to read the processed first context and to write the processed first state information to the memory subsystem; and
   wherein the coherency module is adapted to compare contents of the inload module and the unload module and, if the contents of each correspond to the same TCP connection, replacing the state-related content of the inload module with the state-related content of the unload module.

2. The SDS of claim 1, further comprising:
   a second SPE memory;
   wherein the inload module is further adapted to read a second state information corresponding to a second TCP packet from the memory subsystem and to write a second context to the second SPE memory, wherein the second context includes the second state information and the second TCP packet;
   wherein the SPE is further adapted to read the second context from the second SPE memory, to process the second context, and to write the processed second context to the second SPE memory, wherein the processed second context includes the processed second state information and the processed second TCP packet;

wherein the unload memory is adapted to read the processed second context and to write the processed second state information to the memory subsystem; and whereby the first SPE memory and the second SPE memory form a ping-pong buffer.

3. The SDS of claim 1, wherein the inload module further includes an inload queue for queuing contexts;

wherein the unload module further includes an unload queue for queuing processed contexts; and wherein the contents of the inload module include the queued contexts and the contents of the unload module include the queued processed contexts.

4. The SDS of claim 1, wherein the inload module is further adapted to classify the first TCP packet as a packet type; and wherein the first context further includes the packet type.

5. The SDS of claim 4, wherein the packet type is encoded in the first context as a bit vector.

6. The SDS of claim 1, wherein the first TCP packet includes a current packet sequence number and corresponds to a TCP connection;

wherein the first state information includes a next packet sequence number designating the sequence number of the next TCP packet to be processed; and wherein the inload module is further adapted to determine whether the current packet sequence number corresponds to the next packet sequence number and, if not, to store the first TCP packet for processing after processing earlier-sequenced packets corresponding to the TCP connection.

7. The SDS of claim 1, wherein the first SPE memory and the SPE are implemented in the same physical device.

8. An intranet, wherein at least one SDS as in claim 1 processes packets corresponding to a plurality of TCP connections, each connection having both terminations within the intranet.

9. An intranet, wherein at least one SDS as in claim 1 processes packets corresponding to a plurality of TCP connections, each connection having one termination outside of the intranet.

10. An SDS as in claim 1 that processes packets corresponding to a plurality of TCP connections, each connection having both terminations within the Internet.

11. An SDS as in claim 1, wherein the inload module is further adapted to read a second state information corresponding to a second TCP packet from the memory subsystem, and to write a second context to the first SPE memory, wherein the second context includes the second state intonation and the second TCP packet; and wherein the SPE is further adapted to ignore the second state intonation in response to determining that the first and second TCP packets correspond to the same connection.

12. A network of selected computing devices, wherein at least one SDS as in claim 1 processes packets corresponding to a plurality of TCP connections, each connection having both terminations within the network.

13. A network of selected computing devices, wherein at least one SDS as in claim 1 processes packets corresponding to a plurality of TCP connections, each connection having one termination outside of the network.

14. A load balancer including at least one SDS as in claim 1.

15. A firewall including at least one SDS as in claim 1.

16. An intrusion detection system including at least one SDS as in claim 1.

17. A TCP acceleration system comprising:

an ingress state decision subsystem (SDS);

an egress SDS;

a timer SDS, adapted to perform timing-related tasks;

wherein the ingress SDS is adapted to read from a memory subsystem state information corresponding to incoming TCP packets, to process the incoming packets accordingly, and to write updated state information to the memory subsystem; wherein the egress SDS is adapted to read from the memory subsystem state information corresponding to outgoing TCP packets, to process the outgoing packets accordingly, and to write updated state information to the memory subsystem; and wherein the timer SDS is adapted to read from the memory subsystem state information and to perform time-related processing of the state information and corresponding TCP connections; and wherein the ingress SDS comprises an SDS as in claim 1, and wherein the egress SDS comprises an SDS as in claim 1.

18. A TCP acceleration system comprising:

an ingress state decision subsystem (SDS); an egress SDS;

a timer SDS, adapted to perform timing-related tasks;

wherein the ingress SDS is adapted to read from a memory subsystem state information corresponding to incoming TCP packets, to process the incoming packets accordingly, and to write updated state information to the memory subsystem;

wherein the egress SDS is adapted to read from the memory subsystem state information corresponding to outgoing TCP packets, to process the outgoing packets accordingly, and to write updated state information to the memory subsystem; and wherein the timer SDS is adapted to read from the memory subsystem state information and to perform time-related processing of the state information and corresponding TCP connections; and wherein the ingress SDS comprises an SDS as in claim 2, and wherein the egress SDS comprises an SDS as in claim 2.

19. A TCP acceleration system comprising:

an ingress state decision subsystem (SDS);

an egress SDS;

a timer SDS, adapted to perform timing-related tasks;

wherein the ingress SDS is adapted to read from a memory subsystem state information corresponding to incoming TCP packets, to process the incoming packets accordingly, and to write updated state information to the memory subsystem;

wherein the egress SDS is adapted to read from the memory subsystem state information corresponding to outgoing TCP packets, to process the outgoing packets accordingly, and to write updated state information to the memory subsystem; and wherein the timer SDS is adapted to read from the memory subsystem state information and to perform time-related processing of the state information and corresponding TCP connections; and wherein the ingress SDS comprises an SDS as in claim 3, and wherein the egress SDS comprises an SDS as in claim 3.

20. A TCP acceleration system comprising:
an ingress state decision subsystem (SDS);
an egress SDS;
a timer SDS, adapted to perform timing-related tasks;
wherein the ingress SDS is adapted to read from a memory subsystem state information corresponding to incoming TCP packets, to process the incoming packets accordingly, and to write updated state information to the memory subsystem;
wherein the egress SDS is adapted to read from the memory subsystem state information corresponding to outgoing TCP packets, to process the outgoing packets accordingly, and to write updated state information to the memory subsystem; and
wherein the timer SDS is adapted to read from the memory subsystem state information and to perform time-related processing of the state information and corresponding TCP connections; and
wherein the ingress SDS comprises an SDS as in claim 4, and wherein the egress SDS comprises an SDS as in claim 4.

21. A TCP acceleration system comprising:
an ingress state decision subsystem (SDS);
an egress SDS;
a timer SDS, adapted to perform timing-related tasks;
wherein the ingress SDS is adapted to read from a memory subsystem state information corresponding to incoming TCP packets, to process the incoming packets accordingly, and to write updated state information to the memory subsystem;
wherein the egress SDS is adapted to read from the memory subsystem state information corresponding to outgoing TCP packets, to process the outgoing packets accordingly, and to write updated state information to the memory subsystem;
and wherein the timer SDS is adapted to read from the memory subsystem state information and to perform time-related processing of the state information and corresponding TCP connections; and
wherein the ingress SDS comprises an SDS as in claim 5, and wherein the egress SDS comprises an SDS as in claim 5.

22. A TCP acceleration system comprising:
an ingress state decision subsystem (SDS); an egress SDS;
a timer SDS, adapted to perform timing-related tasks;
wherein the ingress SDS is adapted to read from a memory subsystem state information corresponding to incoming TCP packets, to process the incoming packets accordingly, and to write updated state information to the memory subsystem;
wherein the egress SDS is adapted to read from the memory subsystem state information corresponding to outgoing TCP packets, to process the outgoing packets accordingly, and to write updated state information to the memory subsystem; and
wherein the timer SDS is adapted to read from the memory subsystem state information and to perform time-related processing of the state information and corresponding TCP connections; and
wherein the ingress SDS comprises an SDS as in claim 6, and wherein the egress SDS comprises an SDS as in claim 6.

23. A TCP acceleration system comprising:
an ingress state decision subsystem (SDS); an egress SDS;
a timer SDS, adapted to perform timing-related tasks;
wherein the ingress SDS is adapted to read from a memory subsystem state information corresponding to incoming TCP packets, to process the incoming packets accordingly, and to write updated state information to the memory subsystem;
wherein the egress SDS is adapted to read from the memory subsystem state information corresponding to outgoing TCP packets, to process the outgoing packets accordingly, and to write updated state information to the memory subsystem; and
wherein the timer SDS is adapted to read from the memory subsystem state information and to perform time-related processing of the state information and corresponding TCP connections; and
wherein the ingress SDS comprises an SDS as in claim 7, and wherein the egress SDS comprises an SDS as in claim 7.

24. A TCP acceleration system comprising:
an ingress state decision subsystem (SDS); an egress SDS;
a timer SDS, adapted to perform timing-related tasks;
wherein the ingress SDS is adapted to read from a memory subsystem state information corresponding to incoming TCP packets, to process the incoming packets accordingly, and to write updated state information to the memory subsystem;
wherein the egress SDS is adapted to read from the memory subsystem state information corresponding to outgoing TCP packets, to process the outgoing packets accordingly, and to write updated state information to the memory subsystem; and
wherein the timer SDS is adapted to read from the memory subsystem state information and to perform time-related processing of the state information and corresponding TCP connections.

25. The TCP acceleration system of claim 24, wherein the ingress SDS is further adapted to open and close TCP connections.

26. An intranet, wherein at least one TCP acceleration system as in claim 24 processes packets corresponding to a plurality of TCP connections, each connection having both terminations within the intranet.

27. An intranet, wherein at least one TCP acceleration system as in claim 24 processes packets corresponding to a plurality of TCP connections, each connection having one termination outside of the intranet.

28. A TCP acceleration system as in claim 24, wherein the system processes packets corresponding to a plurality of TCP connections, each connection having both terminations within the Internet.

29. A network of selected computing devices having at least one TCP acceleration system as in claim 24 that processes packets corresponding to a plurality of TCP connections, each connection having both terminations within the intranet.

30. A network of selected computing devices having at least one TCP acceleration system as in claim 24 that processes packets corresponding to a plurality of TCP connections, each connection having one termination outside of the network.

31. A load balancer including at least one TCP acceleration system as in claim 24.

32. A firewall including at least one TCP acceleration system as in claim 24.

33. An intrusion detection system including at least one TCP acceleration system as in claim 24.

34. The TCP acceleration system of claim 24, wherein the ingress SDS includes an SDS.

35. The TCP acceleration system of claim 24, wherein the egress SDS includes an SDS.

36. The TCP acceleration system of claim 24, wherein the timer SDS includes an SDS.

37. A first SDS, comprising: an inload module;
an unload module;
a second memory subsystem;
a second SDS;
wherein the inload module is adapted to read state information corresponding to a TCP packet from a first memory subsystem and to write a context to the second memory subsystem, wherein the context includes the state information and the TCP packet;
wherein the second SDS is adapted to read the context from the second memory subsystem, process the context, and write the processed context to the second memory subsystem; and
wherein the unload module is adapted to read the processed context from the second memory subsystem and to write the processed context to the first memory subsystem.

38. The first SDS of claim 37, further comprising a coherency module adapted to compare contents of the inload module and the unload module and, if the contents of each correspond to the same TCP connection, replacing the state-related content of the inload module with the state-related content of the unload module.

39. A state decision subsystem (SDS) for processing TCP connections with improved efficiency, the SDS comprising:
an inload module;
a simple programmable entity (SPE);
an SPE memory;
an unload module;
a coherency module;
wherein the inload module is adapted to read state information corresponding to a plurality of TCP packets from a memory subsystem and to write a plurality of contexts to the SPE memory, wherein each of the plurality of contexts includes at least one of the plurality of TCP packets and corresponding state information;
wherein the SPE is adapted to read the each of the plurality of contexts from the SPE memory, to process each of the plurality of contexts, and to write the each of the plurality of processed contexts to the SPE memory, wherein the each of the plurality of processed contexts includes a processed TCP packet and corresponding processed state information;
wherein the unload memory is adapted to read each of the plurality of processed first contexts and to write the corresponding processed state information to the memory subsystem; and
wherein the coherency module is adapted to replace a first portion of the state-related content of the inload module, the unload module, and the SPE memory with a second portion of the state-related content of the inload module, the unload module, and the SPE memory if:
the first portion corresponds to the same TCP connection as the second portion; and
the first portion is rendered outdated by the second portion.

* * * * *